United States Patent [19]

West et al.

[11] 4,108,420

[45] Aug. 22, 1978

[54] ADJUSTABLE GAS FLOW CONTROL VALVE

[75] Inventors: Ernest James West, San Jose; Gary M. Brandenburg, San Carlos, both of Calif.

[73] Assignee: Thermco Products Corporation, Orange, Calif.

[21] Appl. No.: 779,611

[22] Filed: Mar. 21, 1977

[51] Int. Cl.² ............................................. F16K 31/06
[52] U.S. Cl. ..................................... 251/129; 251/141
[58] Field of Search ................................. 251/141, 129

[56] References Cited

U.S. PATENT DOCUMENTS

| 2,987,293 | 6/1961 | Knudson | 251/141 |
| 3,168,242 | 2/1965 | Diener | 251/129 X |
| 3,420,496 | 1/1969 | Hallberg | 251/141 |
| 3,469,590 | 9/1969 | Barker | 251/129 X |
| 3,653,630 | 4/1972 | Ritsema | 251/129 |
| 3,684,238 | 8/1972 | Michellone | 251/129 |

Primary Examiner—Arnold Rosenthal
Attorney, Agent, or Firm—George R. Clark; Neil M. Rose; Clifford A. Dean

[57] ABSTRACT

A gas flow control valve having the means of adjusting the tension of the spring to the plunger through which the electromagnetic actuating coil moves the plunger from the valve seat in proportion to the required flow by an externally accessible adjustment means.

3 Claims, 2 Drawing Figures

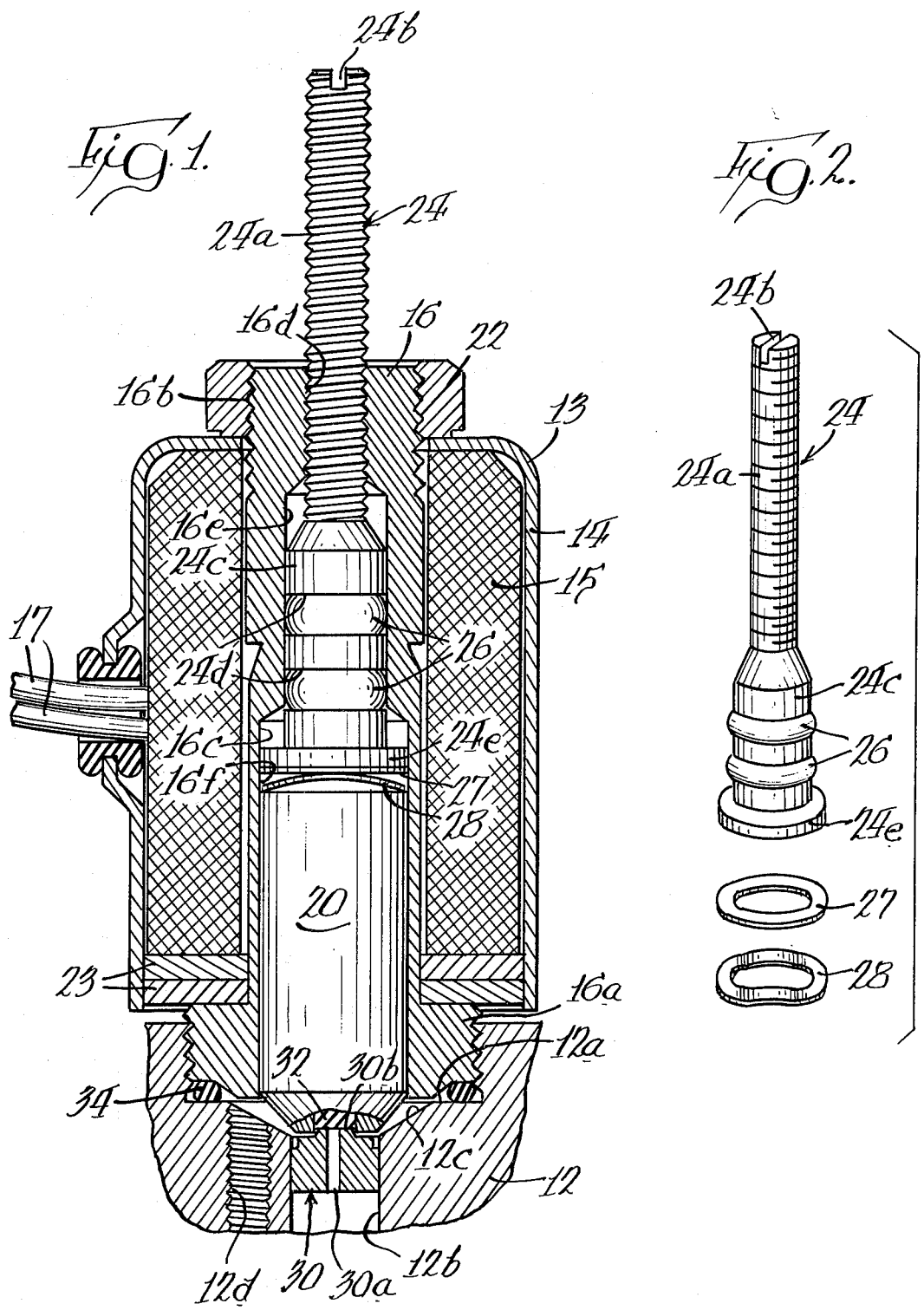

ADJUSTABLE GAS FLOW CONTROL VALVE

BACKGROUND OF THE INVENTION

There are many applications in the semiconductor industry for gas flow control valves. The quantity of gases used in the production of various types of solid state devices is sometimes very small and the quantities must be controlled vary accurately to assure uniformity in the manufacturing process.

Since most of these processes in the semiconductor industry are highly automated, it is necessary that electromagnetic valves be used rather than manually actuated valves. These valves are intended to operate accurately and efficiently to produce a certain gas flow with a particular current input. It has, in the past, been very difficult to manufacture these valves to the standards required by the industry without taking considerable time and going to inordinate expense.

SUMMARY OF THE INVENTION

The invention relates to an electromagnetic valve of the type in which a plunger or armature comprises the valve member which is urged by spring means into engagement with the valve seat. Surrounding the armature or plunger is a coil which, when energized, produces an electromagnetic field which draws the plunger away from the valve seat thereby opening the valve. The movement of the plunger is opposed by a spring washer which has a curved configuration and is flattened by the force of the plunger. The plunger is mounted in a sleeve having a continuous bore within which is also received a plunger or stop member which provides an adjustable abutment for the spring washer. Gasket means are provided to seal the plunger with respect to the bore in the sleve and a threaded shank portion on the plunger is available externally to permit adjustment of the top member. The resulting valve member is simple in construction and inexpensive to manufacture.

It is, therefore, an object of the present inventon to provide an improved solenoid valve having improved calibration means.

It is a further object of the present invention to provide a precision gas flow control valve having means available externally of the valve to calibrate the valve after assembly.

Further objects and advantages of the present invention will become apparent as the following description proceeds and the features of novelty which characterize the invention will be pointed out with particularity in the claims annexed to and forming a part of this specification.

BRIEF DESCRIPTION OF THE DRAWINGS

For a better understanding of the present invention, reference may be had to the accompanying drawings in which:

FIG. 1 is a vertical sectional view of a gas flow control valve embodying the invention; and FIG. 2 is an exploded perspective view of several elements of the valve of FIG. 1.

Referring to the drawings, there is shown in FIG. 1 a gas flow control valve designated generally by reference numeral 11. The valve comprises a base member 12 and a mechanism portion 13. The mechanism portion 13 includes a housing 14 within which is supported a coil 15 and a sleeve 16.

The coil 15 is a conventional solenoid-type coil having many turns of fine copper wire and provided with power input leads 17 which supply current to the coil. The coil produces an electromagnetic field which is dependent on the current through its windings. This field is effective in displacing a plunger or armature 20 which is mounted within the sleeve 16 and is guided for axial movement with respect to the coil 15.

The sleeve 16 is of generally uniform diameter having an enlarged lower end portion 16a, the outer diameter of which is threaded for engagement with threads formed within a pocket 12a in the base number 12. This threaded engagement between the sleeve 16 and the base member 12 assembles the mechanism portion 13 to the base member 12.

The upper end of the sleeve 12 is provided with a threaded portion 16b onto which an assembly bolt 22 is threadedly received. The assembly bolt 22 clamps the housing 14 and the coil 15 against the enlarged lower end portion 16a with a pair of thrust washers 23 being interposed against the lower end of the coil 15.

The sleeve 6 has a bore 16c which extends axially the entire length of the sleeve 16. The bore 16c may be considered to have three portions, an upper threaded portion 16d of reduced diameter, an intermediate portion 16e of slightly greater diameter than the threaded portion 16d and an enlarged bore 16f which extends from about the middle of the sleeve 16 to the lower end. The plunger or armature 20 is slidably received within the bore portion 16f of the sleeve 16. To provide adjustment for the valve 11, there is mounted in the upper end of the sleeve 16 a pistonlike member 24 which is shown in disassembled position in FIG. 2. The member 24 includes an elongated threaded portion 24a which terminates in a slotted head 24b which permits rotary adjustment of the member 24. In order to seal the sleeve 16 against gas flow past the plunger 20, the member 24 is formed with an intermediate portion 24c which has two annular grooves or channels 24d within which are received O-ring sealing gaskets 26. The gaskets 26 are compressed against the walls of the intermediate bore portion 16e thereby preventing gas from escaping axially along the space between the member 24 and the sleeve 16.

The lower end of the member 24 is formed with a circular plate 24e which forms the abutment portion of the member 24. Positioned immediately below the abutment portion 24e is a flat thrust washer 27 and a curved spring washer 28. When the coil 15 is energized, the electromagnetic field produced thereby tends to draw the plunger or armature 20 upwardly, thereby compressing or flattening the spring washer 28. The amount of movement is proportional to the current applied through the washer 15. However, it is important to set or establish the current flow at which the plunger initially opens and permits gas flow. This may be done by rotating the member 24 and thereby moving the abutment portion 24e axially with respect to the bore 16c.

The base member 12 is formed with a gas inlet passageway 12b in which is mounted a valve seat 30. The valve seat 30 has a central orifice 30a and an annular sealing portion 30b. The sealing portion 30b is adapted to abut against a gasket member 32 mounted in the face of the plunger 20. The end of the plunger 20 is received in a conical portion 12c which extends downwardly from the pocket 20a. An outlet passageway 12d provides an exit for the gas which has been passed through the valve seat orifice 30a. Thus, in the closed position of the valve 11, the spring 28 urges the plunger 20 downwardly so that the gasket member 32 seals the opening 30a in the valve seat 30. When sufficient current is passed through the coil 15, the plunger 20 is moved axially against the force of the spring 28 thereby unseating the gasket member 32 and permitting gas to flow outwardly through the passageway 12d. To seal the pocket 12a, there is provided an O-ring gasket 34 which is clamped between the enlarged lower end portion 16a of the sleeve 16 and the pocket 12a of the base member 12.

It should be appreciated that when the valve 11 is initially calibrated, the member 24 may be adjusted when a selected current is applied to the coil 15 and a particular flow is achieved through the orifices 30a. This calibration may be performed while the valve is completely assembled, thereby assuring complete accuracy. The calibration means is extremely simple and the structure of the sleeve, and the member 24 assure a good seal against leakage of gas which might flow past the armature 20.

While there has been shown and described a particular embodiment of the present invention, it will be apparent to those skilled in the art that various changes and modifications may be made without departing from the invention in its broader aspects, and it is, therefore, contemplated in the appended claims to cover all such changes and modifications as fall within the true spirit and scope of the present invention.

What is claimed as new and desired to be secured by Letters Patent of the United States is:

1. A gas flow control valve comprising a base member having a pocket formed to receive a portion of a valve mechanism, said mechanism including a plunger mounted for reciprocation within an elongated sleeve, said sleeve having a bore extending longitudinally therethrough, a first portion of said bore extending from one end of said sleeve being of a diameter to slidably support said plunger and terminating at an annular shoulder, a second portion of said bore extending from said other end of said sleeve and having internal threads formed therein, an elongated stop member having a threaded portion which threadedly engages said second portion of said sleeve bore and having an abutment portion extending into said first portion of said bore, said stop member comprising a piston having a threaded shank received in said second portion of said sleeve, said shank having a portion accessible outside of said sleeve to permit rotation of said piston to translate said plunger longitudinally of said sleeve, said piston being formed with a circular plate forming said abutment portion on the end within said first portion of said sleeve bore, an intermediate portion on said piston between said threaded shank, said plate being of a diameter intermediate the diameters of said plate and of said shank, said bore having a third portion extending between said first and second portions having a diameter intermediate the diameters of said first and second portions, gasket means on said stop member between said abutment portion and said threaded portion to prevent gas leakage through said sleeve, said gasket means comprising at least one O-ring received in an annular channel in said intermediate portion of said piston, said O-ring being compressed in said sleeve against said third portion of said bore, spring means between said plunger and said abutment means, an electrical coil surrounding said sleeve to create an electromagnetic field to move said plunger longitudinally in opposition to said spring means, said base member having a valve seat which is engaged by said plunger to cut off gas flow when said coil is deenergized.

2. The gas flow control valve of claim 1 wherein said spring means comprises a spring washer which is flexed in its unstressed condition and is flattened by said plunger when said coil is energized to open said valve.

3. The combination of claim 1 wherein said spring means comprises a washer having a curved configuration in its unstressed condition, said washer being positioned between said plate and said plunger, said washer being flattened between said plate and said plunger in proportion to the current applied to said coil, said adjustment of said plunger permitting selection of a coil current at which said valve will open.

* * * * *